Aug. 1, 1967  A. C. BEHRINGER  3,333,535
DOCTOR BLADE MECHANISM WITH FLUID SEALING ELEMENTS
Filed Nov. 19, 1964  6 Sheets-Sheet 1

INVENTOR.
ALFRED C. BEHRINGER
BY
his ATTORNEYS

Aug. 1, 1967  A. C. BEHRINGER  3,333,535
DOCTOR BLADE MECHANISM WITH FLUID SEALING ELEMENTS
Filed Nov. 19, 1964  6 Sheets-Sheet 3

INVENTOR.
ALFRED C. BEHRINGER
BY
Brumbaugh, Free, Graves & Donohue
his ATTORNEYS

INVENTOR.
ALFRED C. BEHRINGER

United States Patent Office 3,333,535
Patented Aug. 1, 1967

3,333,535
DOCTOR BLADE MECHANISM WITH FLUID SEALING ELEMENTS
Alfred C. Behringer, Ringwood, N.J., assignor to Publication Corporation, New York, N.Y., a corporation of New York
Filed Nov. 19, 1964, Ser. No. 412,401
9 Claims. (Cl. 101—157)

This invention relates to printing presses and, more particularly, to a novel and improved intaglio printing press unit which is quickly and easily changed over and adjusted to provide considerable versatility of use. Complete presses are frequently made up of from five to nine separate units.

Many known printing presses, including intaglio printing presses, are designed for use with only a single size plate cylinder and thus can be used to print signatures of only sizes which produce, when multiplied by an integer, a value substantially equal to the circumferential dimension of the plate cylinder. Such presses are thus of limited versatility, and for a printing plant to be able to print a variety of signature sizes, it must be equipped with several presses, each having different sized plate cylinders, or a press capable of printing with cylinders of different sizes.

It is thus advantageous to have presses which can take plate cylinders of different sizes, particularly when the company has relatively small runs or runs of different sizes. To provide for different sized plate cylinders, a press unit must have a number of adjustable elements, and particularly, an adjustable doctor blade, ink supply system and seal arrangement to close off an ink supplying chamber to prevent spoilage of printed products. While there are a number of presses known in the prior art which can take cylinders of different sizes, they are often difficult to change over, thus requiring relatively long shut-downs to convert from one size cylinder to another, are sometimes adjustable for only a small range of cylinder sizes and/or subject to breakdown or inefficient operation because of their complex structure.

There is provided, in accordance with the invention, a novel and improved intaglio press unit which can take plate cylinders of various sizes within a relatively wide range, is quickly and easily changed over from one size to any other and which is therefore highly efficient and versatile in operation and uses. The press unit includes an ink applicator which can be adjusted into the proper position for each size cylinder, a doctor blade which is carried by a pivotably mounted support so that it can be easily and quickly moved into a plurality of positions in each of which the blade is properly engaging the particular size cylinder and means for sealing the ink supply chamber to prevent leakage of ink around the end of the doctor blade.

The doctor blade mounting arrangement is preferably carried by upstanding fixed brackets mounted on a transverse horizontal press frame member. Journaled in bearings in the brackets for rotation and longitudinal movement is a shaft to which vertical blade holder support members are affixed. The doctor blade holder is pivotally mounted near the upper ends of the vertical support members. A preferred doctor blade holder is one which is described in my prior patent U.S. No. 3,017,828, entitled "Doctor Blade Mechanism." Means are provided for reciprocating the shaft, the reciprocating means including a second longitudinally extending shaft which is also journaled in the fixed brackets on the transverse press frame member. The second shaft is coupled to the first shaft and oscillation imparted to the second shaft is transferred through the coupling to the first shaft and thence to the doctor blade through the support members fixed to the first shaft. The above-described mechanism is of low mass and produces a minimum of frictional resistance to oscillation. Accordingly, its operation is smooth, particularly during the critical portion of the reciprocating movement of the blade when the direction of movement changes and this is particularly important to obtaining good and consistent tone values.

One difficulty encountered in providing an intaglio press which can accommodate plate cylinders of different sizes is to provide a sealing arrangement to close off the ink supply chamber which can easily be changed over to accommodate different sized cylinders, and a particular problem is to close off the chamber for the ink supply in the area at the ends of the doctor blade. For that matter, the problem of adequate seals around the doctor blade, which is reciprocated longitudinally across the surface of the plate cylinder, is encountered, moreover, not only in presses arranged to accommodate different sized plate cylinders but even with presses which can accommodate plate cylinders of only one size.

In some conventional presses, an ink chamber is closed off by a cover extending up in front of the plate cylinder, a rear cover or housing, and seals attached to the end frame members and curving over the upper surface of the cylinder at the ends. The end seals are usually engaged at one transverse end by the front cover and are spaced at the other transverse end from the front surface of the doctor blade. Fixed to a mounting behind the doctor blade is a flexible seal strip which extends upwardly and forwardly so that the outer edge engages the back surface of the doctor blade.

In the above-described and other seal arrangements, a narrow slot is often left open between the edge of the flexible seal strip and the back transverse end of the end seal, the slot being left to enable the doctor blade to move back and forth. This slot provides a very serious leakage point, because ink removed by the blade is pumped out through it by the movement of the cylinder against the blade.

Another disadvantage of this type of conventional arrangement is the effect of the flexible sealing strip on the doctor blade. Because the strip contacts and, to a degree, pushes on the blade, the scraping operation of the blade is affected, the blade being deformed by the strip out of its desired natural conformity to the cylinder surface.

The seal problems mentioned above are further complicated when the press is arranged to accommodate plate cylinders of various sizes. Because the end seal and flexible strip are fixed, they must be removed and replaced, or adjusted for each size cylinder. The problem of proper engagement of the seals thus becomes even more difficult when different cylinders are used.

Thus, an important feature of the present invention is the provision of a seal arrangement, that is, a seal for preventing ink from leaking from the ends of the doctor blade out of a closed ink chamber. The seal, in accordance with the invention, comprises a bracket member pivotally mounted at each end of the press and sealing means carried by each bracket member and having a portion disposed closely adjacent to the end frame members for removing material from the ends of the doctor blade and directing it outwardly toward the inner face of the adjacent end frame member. Preferably, the sealing means includes a sealing element having a first surface disposed closely adjacent the back face of the doctor blade to prevent ink from passing between the doctor blade and the sealing element and a second surface angularly related to and intersecting the said first surface for directing the ink outwardly toward the end frame member.

As a further feature of the inveniton, means are provided for maintaining the sealing element in a predetermined position relative to the doctor blade, regardless of the size of the printing cylinder, such means preferably including an element on the mounting member of the end seal arrangement which slidably engages the doctor blade holder and means for urging that element into engagement with the holder at all times.

The press also has a back cover plate which extends between the end frame members and forms, with other cover plates, a chamber in which the ink picked up from the reservoir or fountain by the plate cylinder or which is sprayed onto the cylinder, some of which is thrown off of or splashed by the cylinder, is confined. The doctor blade holder carries a downwardly and rearwardly extending flexible seal strip which, when the blade is in position, engages the upper edge of the back cover plate, the strip thereby forming a wall of the ink-confining chamber between the reciprocating doctor blade and a fixed wall element.

For a better understanding of the above-mentioned and other features of the press unit and of the invention, reference may be made to the following detailed description of an exemplary embodiment, taken in conjunction with the figures of the accompanying drawings, in which.

Figure 1:
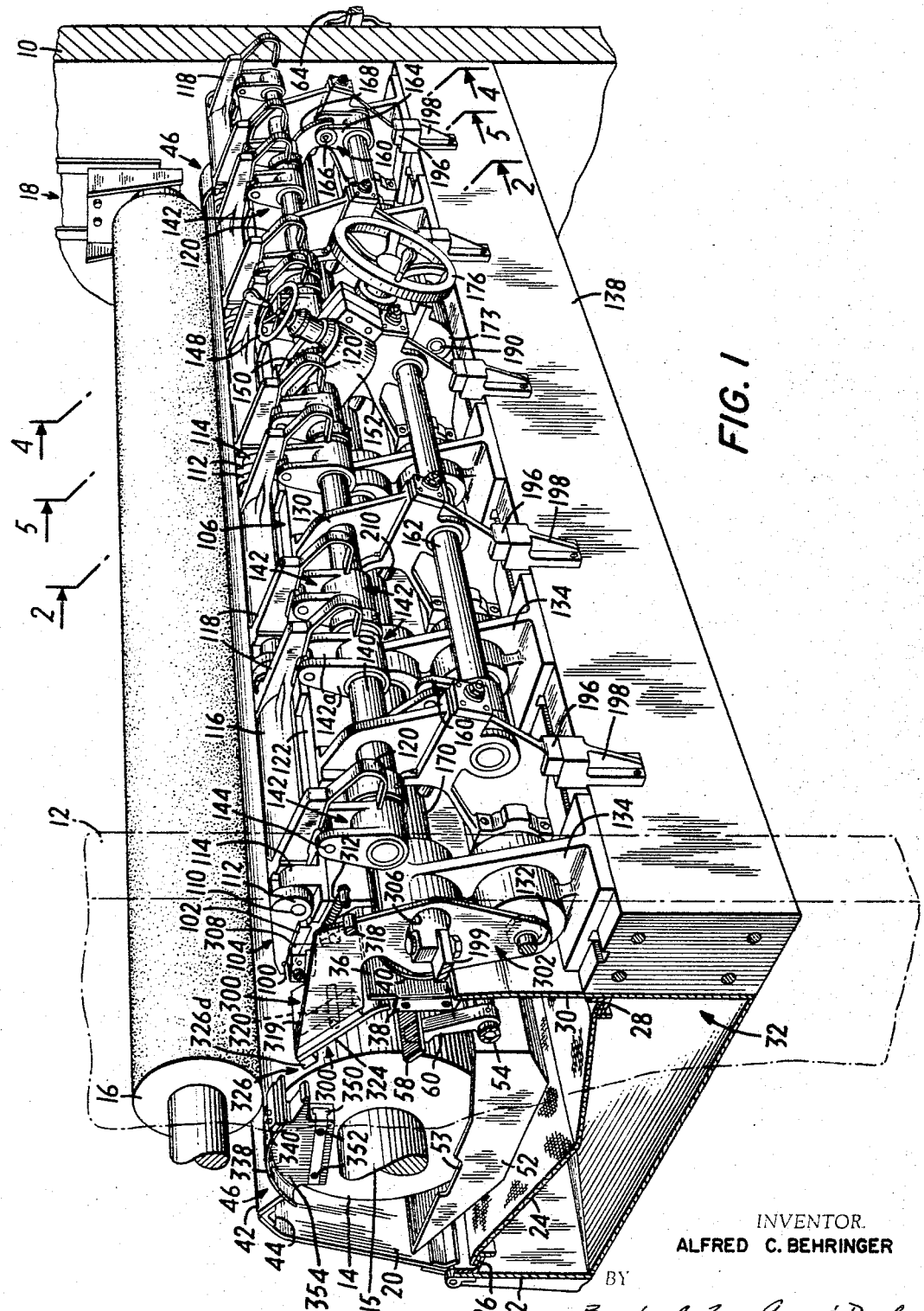
FIGURE 1 is a pictorial view of the back of the press with portions of the press frame and housing removed to more clearly reveal the interior parts.
Figure 5:
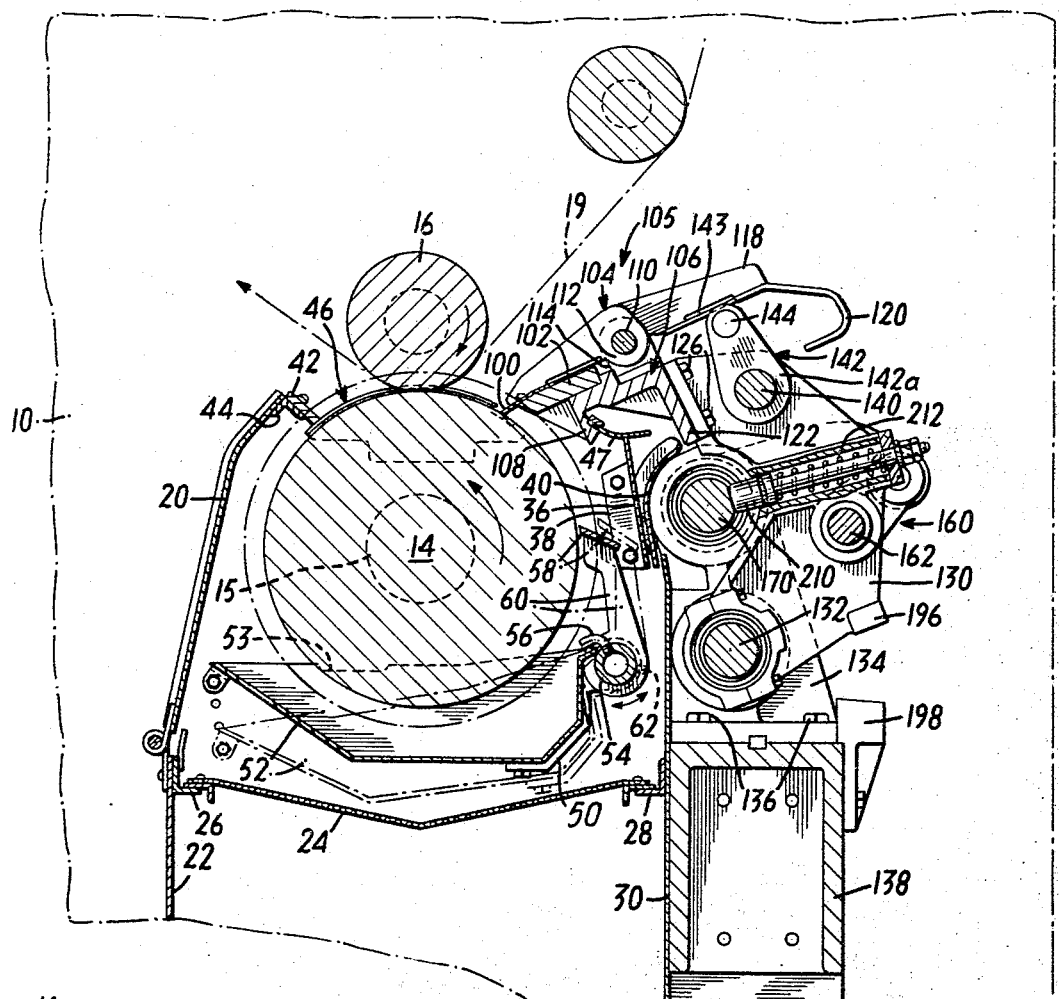
FIG. 5 is a view in section of the press taken generally along the line 5—5 of FIG. 1 and in the direction of the arrows, the view illustrating the doctor blade unit in operative position.
Figure 6:
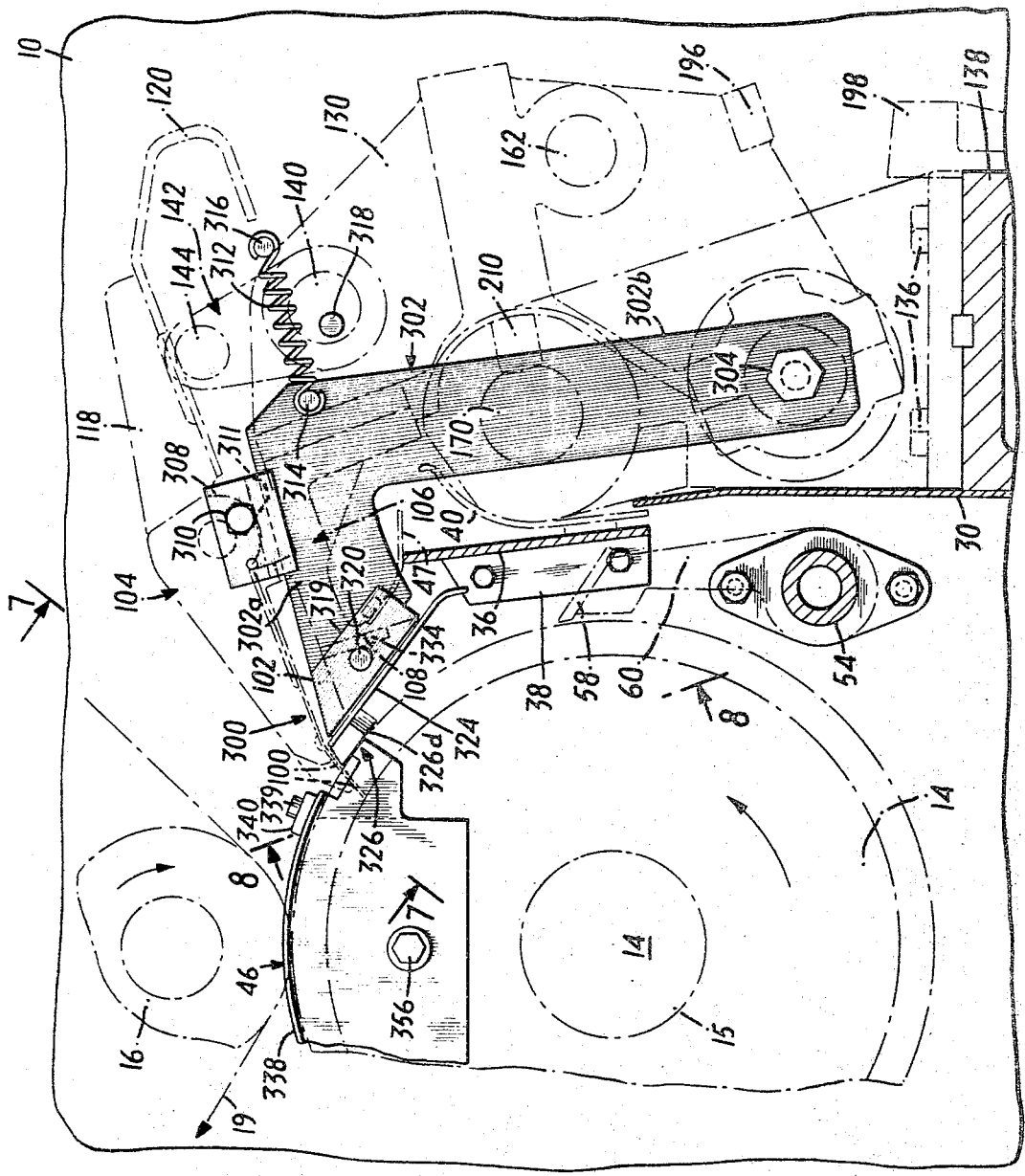
Figure 7:
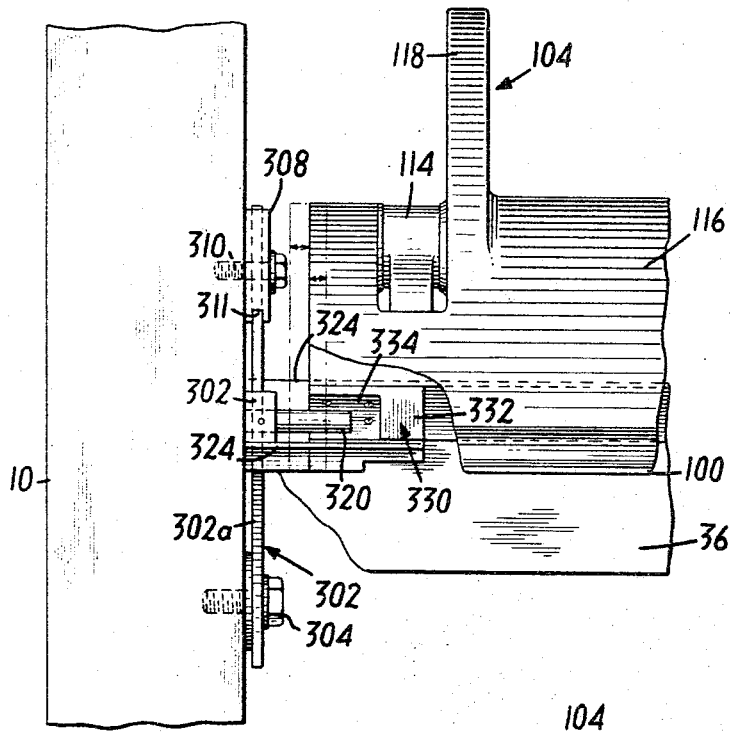
Figure 8A:
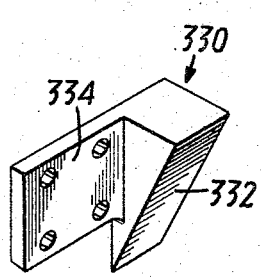
Figure 8:
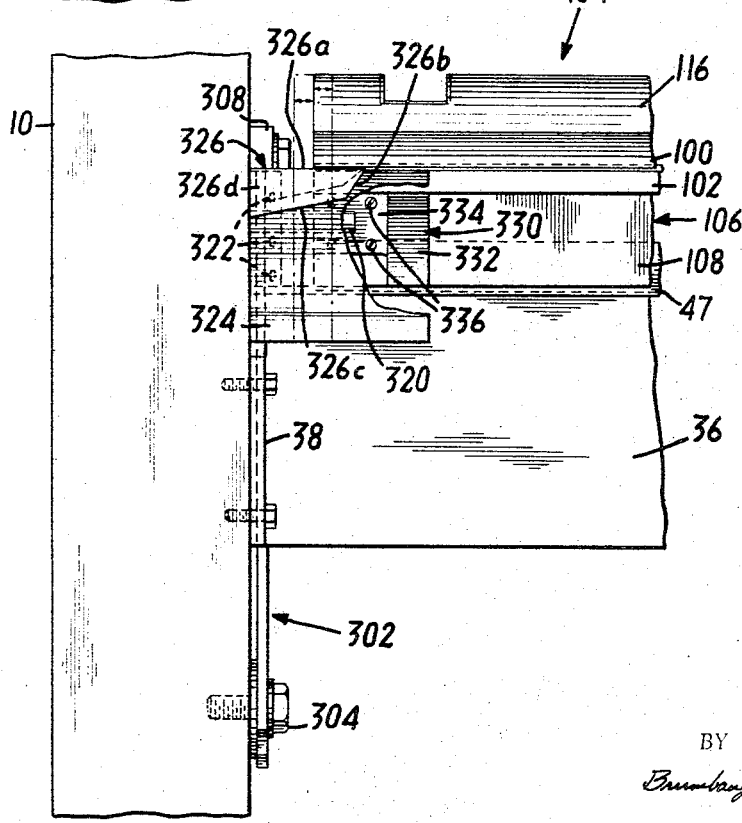
Figure 9:
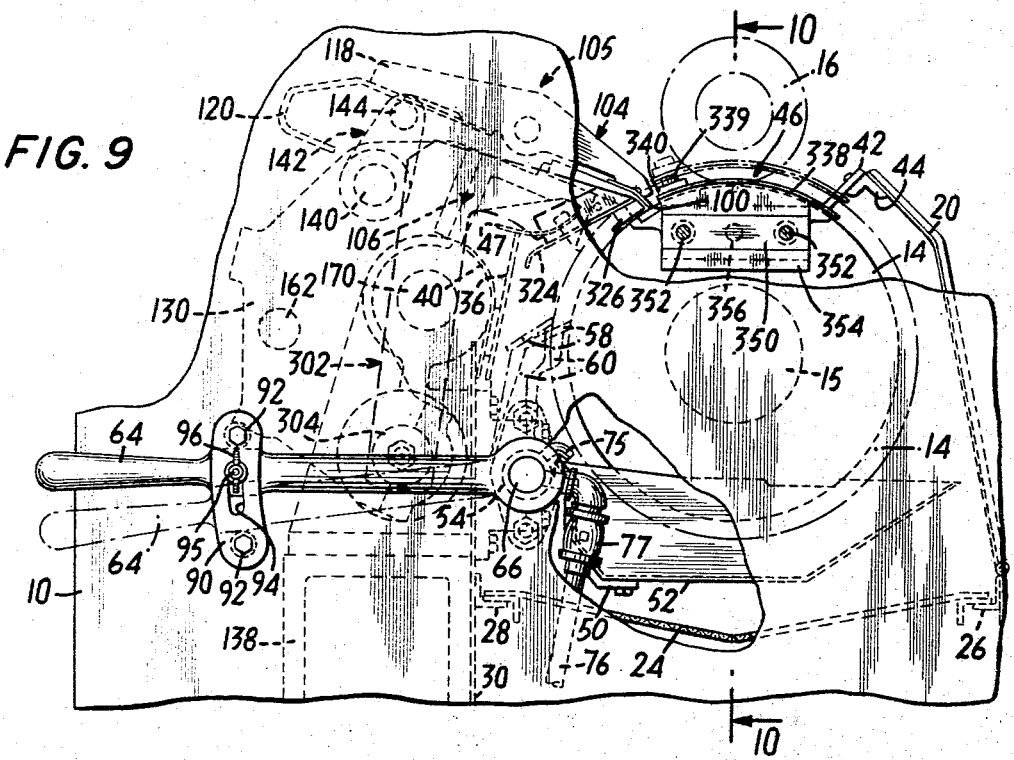
Figure 10:
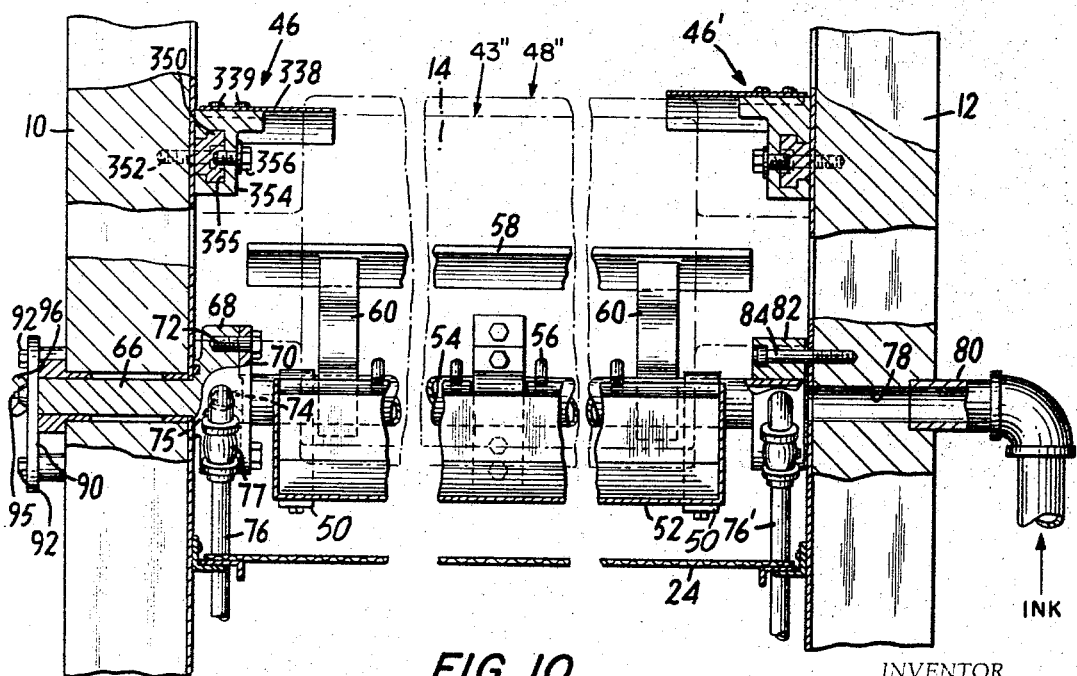

FIG. 6 is an end view on a larger scale than that of FIGS. 1 to 5 taken along a plane adjacent the end of the plate cylinder of the press and looking outwardly toward the end frame member, the view being of the end of the press which is to the right in FIG. 1 and illustrating an end seal arrangement in solid and dotted lines and some of the structure inwardly of the plane of the view in phantom lines;

FIG. 7 is an elevational view of the end seal illustrated in FIG. 6, the view being taken along an inclined plane indicated generally by the lines 7—7 and in the direction indicated by the arrows;

FIG. 8 is a top view of the apparatus illustrated in FIG. 6, the view being taken along an inclined plane generally represented by the line 8—8 in FIG. 6 and in the direction indicated by the arrows;

FIG. 8A is a pictorial view of a slider member carried by the doctor blade holder;

FIG. 9 is an end elevational view of the press, the view being of the right end of the press as illustrated in FIG. 1 and taken from outside the end frame member looking inwardly, portions of the end frame member being broken away to more clearly illustrate the interior parts; and FIG. 10 is a detail back sectional view of the press taken generally along the line 10—10 of FIG. 9 and in the direction of the arrows, portions being broken away and the plate cylinder not being included in the view.

Referring first to FIG. 1, the press includes vertically disposed end frame members 10 and 12 which carry a plate cylinder 14 and an impression roll 16. The shafts 15 at the ends of plate cylinder 14 are mounted in bearings in the end frame members in a manner such that removal and replacement of the cylinders can be accomplished quickly and conveniently. No particular plate cylinder mounting arrangement is shown or described herein, because suitable arrangements are well known to those skilled in the art. The impression roll 16 is journaled in bearings (not shown) carried by an adjustable mounting bracket 18 so that the impression roll can be moved relative to the plate cylinder in order to be properly adjusted to the plate cylinder and to accommodate plate cylinders of different sizes. The plate cylinder is rotated counterclockwise and the impression roll clockwise, as viewed in FIG. 1, and together the cylinder 14 and roll 16 form a printing couple through which a web 19 to be printed is conveyed by apparatus (not shown) of any suitable design.

The ink to be transferred from the plate cylinder to the paper web is applied to the surface of the cylinder and then removed to leave ink only in the etched images thereon by apparatus (to be described below) contained in a closed ink-confining chamber defined (in part) by the end frame members 10 and 12, by a front cover plate 20, which extends entirely across the front of the press and is hinged to the upper end of a vertical housing plate 22, by a base plate 24 carried on angle supports 26 and 28 and by a vertical rear housing plate 30. Below the base plate 24 of the ink-confining chamber 24 is a storage reservoir 32 for the ink.

Referring for the moment to FIG. 5, the ink-confining chamber further includes a transverse splash plate 36 mounted above the vertical rear wall plate 30, the splash plate 36 overlapping and spaced from the upper edge of the vertical plate 30. The splash plate 36 includes flanges 38 at opposite ends which are attached to the end frame members 12 and 14 of the press to secure the plate 36 in the press. The splash plate 36 is also attached to fixed vertical brackets (to be described hereinafter), and behind and spaced from the splash plate 36 with respect to the plate cylinder 14 is a drip guard 40 which is also secured to the fixed vertical brackets and curves rearwardly at its upper end. The upper portion of the ink-confining chamber is defined by a transverse strip 42 which is secured to the upper end of the front cover plate 20 by an angle 44 and, as shown in FIG. 1, it engages curved end covers 46 which are fastened on the inside of each of the end frame members 10 and 12. The end covers 46 will be described in greater detail hereinafter. The upper edge of the rear splash plate 36 is engaged, as shown in FIG. 5, for example, by a flexible seal strip 47 carried by the doctor blade holder. Additionally, the ink-confining chamber is further defined by the doctor blade itself and by an end seal structure which co-acts with the doctor blade as will be described in greater detail below.

Within the ink-confining chamber and hinged on the ink supply pipe by brackets 50 is an ink pan 52. Suitable adjusting means is provided adjacent the front end of the ink pan 52 to enable it to be raised and lowered to accommodate plate cylinders of various sizes and to permit removal and replacement of the cylinders. The ink pan 52 is filled with ink to a predetermined level, such as to the level of an overflow notch 53 in the ends thereof, and the lower portion of the plate cylinder is immersed in the pan so that it continually picks up a coating of ink and carries it from the pan as the cylinder is rotated.

Referring now to FIG. 5, ink is delivered by a pump (not shown) to the pan 52 by means of a pipe 54 which extends entirely across the press and is provided with a plurality of spaced-apart nozzles 56 which are directed into the pan 52. Excess ink delivered to the pan 52 overflows through the notches 53 onto the base plate 24 of the ink-confining chamber, which also collects ink splashed by the cylinder and ink removed by a deflector blade and the doctor blade. The ink collected on the plate 24 is piped away from the bottom and returned to the main supply or to the pump.

As the plate cylinder rotates, the major part of the excess amount of ink applied by immersion of the plate cylinder in the pan 52 is removed by a deflector blade 58 which is supported by a plurality of upwardly extending brackets 60 affixed by set screws 62 to the ink supply pipe 54. The deflector blade 58 is arranged to be properly positioned close to, but not in contact with, plate cylinders of different sizes, as represented by the alternate sized cylinder and the alternate position of the blade shown in phantom lines in FIG. 5, by means of a lever 64 provided at the right end of the press (with respect to the view thereof in FIG. 1).

As illustrated in greater detail in FIGS. 9 and 10, the lever 64 extends rearwardly along the outside of the press end frame member 10 and is affixed to a shaft 66 extending through the press frame member which is formed on a circular plate 68. The plate 68 receives the end of the ink supply pipe 54 which is held thereon by an annular clamp plate 70 secured to the circular plate 68 by bolts 72.

Referring still to FIGS. 9 and 10, the circular plate 68 is provided with a bore 74 extending axially with respect to the shaft 68 and with a generally radially extending bore 75 which is threaded at its outer end and receives a pipe 76. A similar pipe 76' is provided on the opposite end of the ink supply pipe 54. As may be best seen in FIG. 9, the pipes 76 and 76' extend first toward the front of the press and then turn downwardly and are provided with control valves 77 which are adjusted to provide a predetermined degree of bleeding from the ink supply pipe 54 in order to obtain the desired flow of ink from the supply pipe through the nozzles 56. Excess ink drawn off by the pipes 76 and 76' is returned to the supply reservoir 32 in a manner which provides flow and circulation in the reservoir to prevent sedimentation in the bottom of the reservoir.

At the right end of the pipe 54, as it is illustrated in FIG. 10, an opening 78 is provided in the press frame member 12 which receives the end of an ink supply conduit 80 through which the ink is pumped. The end of a supply pipe 54 communicates with the passage 78 and is secured in a coupling 82 which is fastened by bolts 84 to the press frame 12.

As previously mentioned, the positioning of the deflector blade 58 to provide the desired removal of ink from plate cylinders of different diameters is accomplished by adjusting the position of the lever 64. As shown in FIGS. 9 and 10, the lever 64 passes through a guide element 90 attached by bolts 92 to the press frame member 10. A slot 94 formed in the guide element 90 receives a screw 95 extending outwardly from the lever 64, and a wing nut 96 is threaded onto the screw 95 and is tightened down to clamp the lever 64 in the desired adjusted position.

Figure 2:
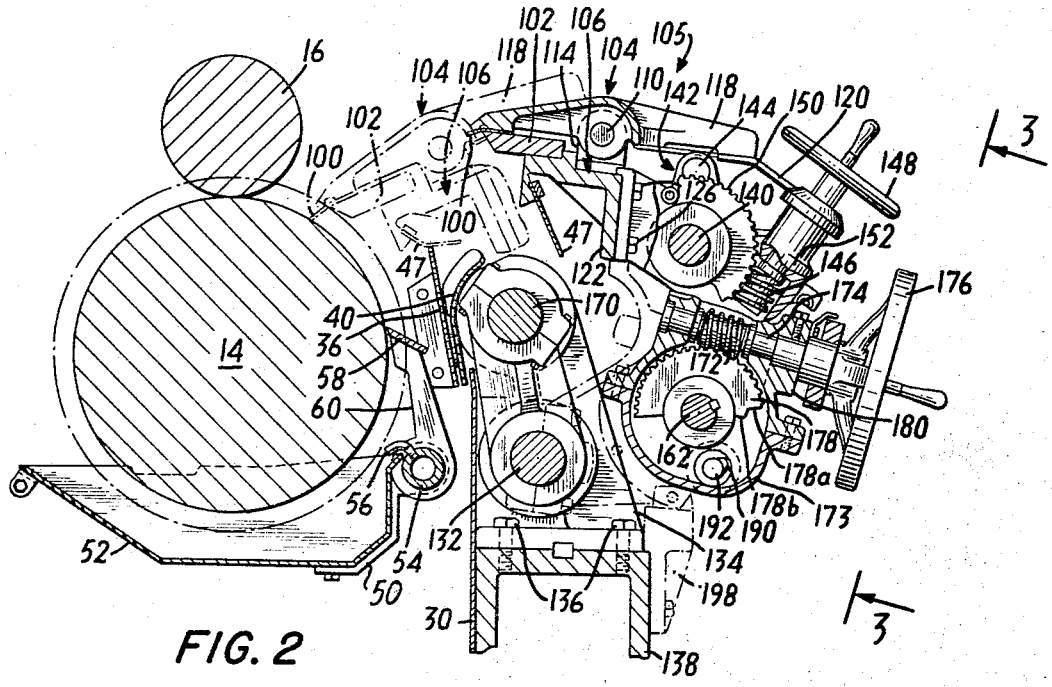
FIG. 2 is a view in section taken generally along the line 2—2 of FIG. 1 and in the direction of the arrows and illustrating adjusting mechanisms of the doctor blade unit.
Figure 4:
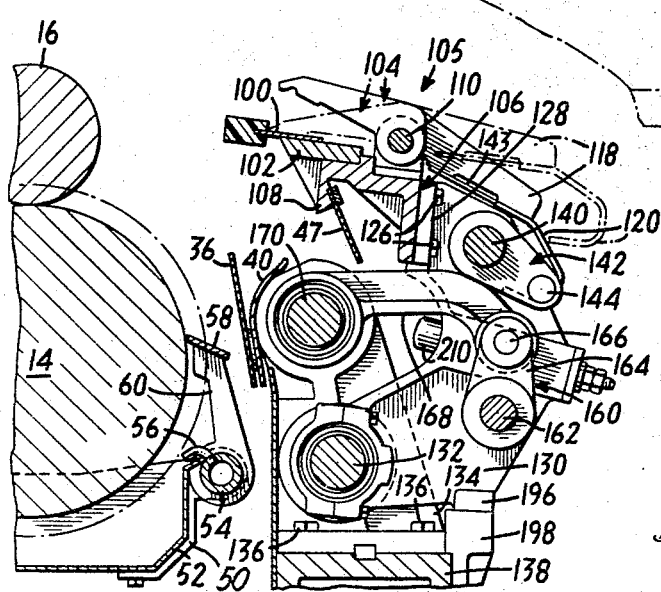
FIG. 4 is a view in section showing the doctor blade unit in its inoperative position, the view being taken generally along the line 4—4 of FIG. 1 and in the direction of the arrows.

Upon further rotation of the plate cylinder 14, ink not removed by the deflector blade 58 is removed from the surface of the plate by a doctor blade 100, thereby leaving ink only in the dot or other type of etched image formed in the plate cylinder surface in a manner known to those skilled in the art. The doctor blade 100 extends entirely across the press and is clamped between a lower clamping jaw 102 and an upper clamping jaw 104 of a doctor blade holder, which is designated generally by the reference numeral 105. As best illustrated in FIGS. 2, 4 and 5, the lower clamping jaw 102 is carried on a holder frame member 106 which extends across the press for approximately the entire length of the doctor blade. Formed along the front edge of the holder frame member 106 is a downwardly extending flange 108 to which the flexible sealing strip 47 is attached. The upper clamping jaw 104 is formed in segments, each of which is pivotally mounted by means of pins 110 which extend through lugs 112 formed on the jaws 104 and through upstanding complementary lugs 114 formed on the frame member 106. As best illustrated in FIG. 1, the upper jaw segments include front body portions 116 which together extend over substantially the entire length of the doctor blade 100 and a pair of spaced-apart rearwardly extending arms 118, each of which is provided with a forwardly facing hook 120. The holder frame member 106 and the lower clamping jaw 102 preferably extend continuously across the press for the entire length of the blade 100.

As best illustrated in FIGS. 1, 4 and 5, the blade holder frame member 106 includes a downwardly directed flange 122 formed along its outer or back edge, with respect to the plate cylinder 14, which is fastened by bolts 126 to a plate 128 carried on the upper end of each of a plurality of pivotally mounted generally C-shaped carrier members 130. The carrier members 130 are clamped and keyed on a shaft 132 which extends transversely across the press parallel to the axis of the plate cylinder 14 and is journaled for pivotal and longitudinal movement in bearings (not shown) mounted in upstanding fixed brackets 134. The fixed brackets 134 are fastened by bolts 136 to a major transverse frame member 138 of the press, which extends between and is bolted to the end frame members 10 and 12.

Extending through the upper ends of the carrier members 130 and arranged to rotate therein is a shaft 140 to which a plurality of yokes 142 are affixed. A pin 144 extends between the ears 142a of each of the yokes 142 and is arranged, as shown in FIG. 5, to bear against a leaf spring 143 secured on the underside of the rearwardly extending arms 118 on the doctor blade upper clamping jaws 104 to tightly hold the blade 100 in clamped position.

Figure 3:
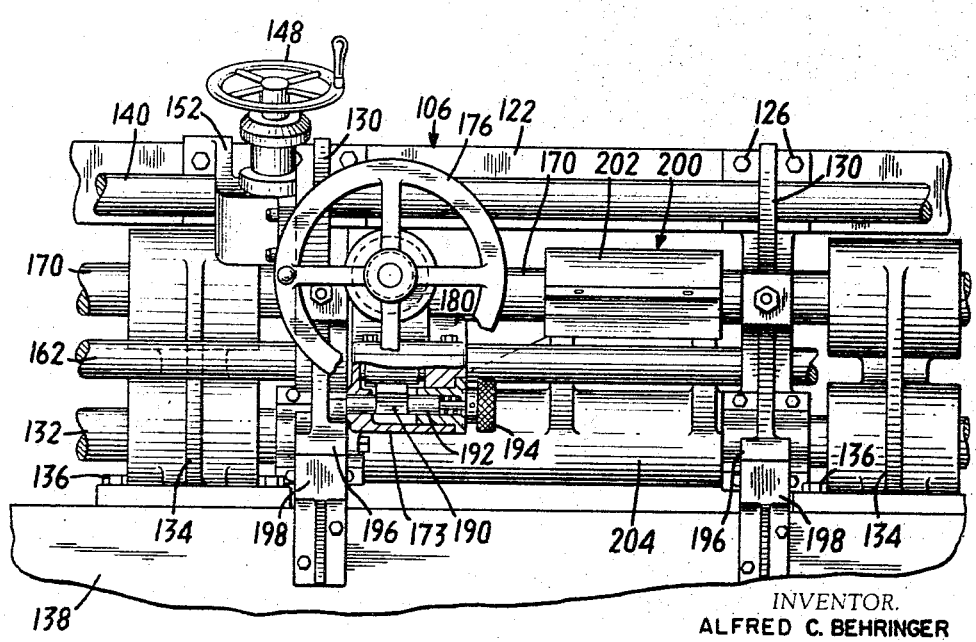
FIG. 3 is an elevational view of the doctor blade support unit and the adjusting mechanisms therefore of FIG. 2, the view being taken generally along a plane defined by the line 3—3 of FIG 2. and in the direction of the arrows.

As shown in FIGS. 2 and 3, the shaft 140 is arranged to be rotated by a worm gear 146 which is turned by a handwheel 148 and meshes with a gear 150 affixed to the shaft 140. The worm gear 146 is carried in a bracket 152 bolted to one of the doctor blade carrier members 130 and to the flange 122 of the doctor blade holder frame member 106. Upon rotation of the handwheel 148, the worm gear 146 drives the gear 150 to rotate the shaft 140 between a position wherein the yokes 142 are in an upper position, as shown in FIG. 5, to retain the blade holder upper clamping jaw 104 in the blade clamping position, or into a generally downward and rearward position, as shown in FIG. 4, in which the upper clamping jaw is pivoted into an open position. Movement of the yokes 142 toward the downward and rearward position engages the pins 144 in the hooks 120 to pivot the body 116 about pins 110 thus separating the jaw 104 from lower jaw 102 so that the blade can be removed and replaced with another.

This arrangement of the doctor blade holder is generally similar in operation to the arrangement described in my previous patent U.S. No. 3,017,828 which issued Jan. 23, 1962. In that patent, I have also disclosed a method of quickly and accurately adjusting the doctor blade to the plate cylinder which can also be utilized with the above-described doctor blade holder. Reference may be made to that patent for a complete description of the preferred method of adjusting and clamping the doctor blade 100 of the press described and shown herein in the proper position.

Referring still to FIGS. 2 to 5, the entire doctor blade unit is arranged to be pivoted to move the blade 100 into and out of engagement with the plate cylinder 14 and, moreover, to be adjusted to accommodate plate cylinders of different diameters. To this end, a crank arrangement 160 is provided which includes a crankshaft 162 extending entirely across the press between the outermost ones of the carrier members 130 and rotatably mounted in the carriers 130. As best shown in FIG. 4, the shaft 162 carries a plurality of fixedly mounted crank arms 164, each of which is coupled by a pin 166 to a cooperative crank arm 168 fixed on a transverse shaft 170. The shaft 170 is journaled for rotation and longitudinal movement in bearings mounted adjacent the upper ends of the fixed brackets 134.

Referring particularly to FIGS. 2 and 3, the crankshaft 162 is rotated by a worm gear 172 on a shaft 174 which is turned by a handwheel 176 and drives a gear 178 affixed to the crankshaft 162. The worm gear 172 is mounted in a bracket 180 which includes a housing 173 for the gear 178 and is suitably attached to one of the pivotal carrier members 130.

The gear 178 is arranged to be positively stopped and held in a predetermined position at which the doctor blade is set to the desired protrusion for each different sized cylinder. The gear is stopped by a small interceptor cam 190 having a shaft 192 which extends inwardly through the housing 173 and is provided at its outer exterior end with a knob 194. When the handwheel 176 is turned clockwise, the gear 178 and shaft 162 are turned clockwise, with respect to the view in FIG. 2, thereby moving the crank arms 160 clockwise and pulling the entire doctor blade unit into the operative position illustrated in FIG. 5. Depending upon the setting of the cam 190, which is provided by manual rotation of the knob 194, the cam is engaged by a cooperative surface 178a or 178b on the edge of the gear 178 to position the doctor blade mounting unit properly for a particular diameter plate cylinder. In the illustrated embodiment, only two positions in which the doctor blade unit can be set are shown, but it will be seen that a suitable cam and cooperative edge of the gear 178 can be provided to enable any desired number of settings for the doctor blade unit so that plate cylinders of many different sizes can be used in the press. Also, a lock-pin type of arrangement in which a pin is inserted in a predetermined position to block the movement of the gear beyond a certain point can be used. Suitable indicia of the position of the cam 190 can be provided to indicate the setting of the cam or a lock-pin arrangement with relation to the size of the plate cylinder. An adjustable setting arrangement for stopping and holding the doctor blade unit in a predetermined position is an important feature of the press because it permits the doctor blade to be moved out of engagement with the plate cylinder when desired and then returned to operative position without having to be readjusted.

When the handwheel 176 is rotated counterclockwise, the gear 178 and crankshaft 162 are also rotated counterclockwise, and the crank arms 164 are turned against the crank arms 168 on the shaft 170, thereby pushing the entire doctor blade unit into the open or disengaged position, as illustrated in FIGS. 2 and 4. The pivotal carrier members 130 are prevented from rotation into an open position beyond a certain point by engagement of seats 196 thereon with stops 198 affixed along the back edge of the frame member 138.

Referring next to FIGS. 1 and 3, the upper shaft 170 which extends through the fixed brackets 134 is coupled by a bar 199 to suitable means (not shown) exteriorly of the press end frame member 12 for imparting longitudinal oscillating movement of the shaft 170. As best shown in FIG. 3, the shaft 170 is locked to the other longitudinally movable shaft 132 by means of a coupling 200 having an upper clamp element 202 secured to the shaft 170 and a lower element 204 which extends between adjacent lower clamp arrangements by which the pivotal doctor blade carrier members 130 are affixed onto shaft 132. Longitudinal reciprocation of the shaft 170 thereby imparts through the coupling 200 longitudinal oscillation to the shaft 132 and carrier members 130 and thus to the doctor blade 100.

The pivotal doctor blade carrier members 130 are provided with pins 210 which engage the shaft 170, and springs 212 carried in housings formed in the members 130 urge the members 130 away from the shaft 170. This arrangement takes the looseness out of the various crank and bearing fits of the doctor blade unit, thus preventing vibration of the doctor blade unit in a radial direction with respect to the plate cylinder 14.

It will be noted that reciprocation of the doctor blade is accomplished by reciprocating only the carrier members 130 and shafts 132 and 170 to which the carrier members are fixed, rather than by reciprocation of an entire mounting base. Moreover, the shafts 132 and 170 are carried in bearings, and the frictional resistance to reciprocation is substantially reduced. The significant reduction in the mass which is reciprocated and in the frictional resistance to the reciprocation in the press of the invention thus facilitates reciprocation of the shaft and enables the use of a reciprocatory mechanism constructed of lighter structural elements. Moreover, the harmful vibration, particularly as the direction of movement is changed, often encountered with present arrangements, is eliminated, the operation being smooth and sure. Thus, the doctor blade support and reciprocatory mechanism of the press constitutes a significant advantage over many previously known presses.

Referring next to FIGS. 6, 7, 8 and 8A, and also to FIG. 1, the press is provided with novel and improved end seal arrangements 300 which prevent ink from escaping from the ink-confining chamber in the region outwardly of the ends of the doctor blade 100. The end seals 300 at each end of the doctor blade 100 are substantially identical, though reversed, and therefore only the end seal which is located at the right end of the press with respect to the view of FIG. 1 is described herein and shown in detail in the drawings.

As best shown in FIG. 6, the end seal 300 comprises a generally L-shaped bracket or arm 302 which is pivotally mounted by means of a bolt 304 installed in the press end frame member 10. The pivotal axis of the bracket 302 is coincident with the axis of rotation of the doctor blade pivotal support brackets 130. Thus, the doctor blade 100 and the end seal arrangement 300 are both pivotable and adjustable conjointly. The bracket 302' at the left end of the press (as shown in FIG. 1) includes a slot 306 formed in the longer leg to permit the bar 199 of the actuating mechanism to be coupled to the shaft 170, but no slot is needed in the bracket 302 at the other end of the press. The bracket 302 is supported against transverse movement toward the center of the press by a guide 308 fastened by bolt 310 to the frame member 10. The upper edge of the shorter leg 302a of the bracket 302 is received in a slot 311 formed in the guide 308.

The bracket 302 is urged in a direction away from the plate cylinder 14 by a spring 312 connected between a pin 314 on the bracket and a pin 316 fastened on the frame member 10. The outermost retracted position of the bracket 302 relative to the plate cylinder 14 is established by a stop pin 318 which extends outwardly from the frame member 10 and engages the outer edge of the longer leg 302b of the bracket 302.

Attached at the inner end of the shorter leg 302a of the bracket 302 and carried on the inside face with respect to the frame member 10 is a block 319 carrying an inwardly extending pin 320. Fastened along the inner face of the block 319 by screws 322 is a splash plate 324. As best shown in FIG. 8, the splash plate 324 extends from the inner face of the frame member 10 to a point several inches inwardly from the end of the doctor blade 100 and, as best shown in FIG. 6, has a major surface lying in a plane which is generally parallel to a plane tangent to the plate cylinder at the point where the doctor blade 100 engages it. The back edge of the plate 324 curves downwardly and extends below the top edge of the rear plate 36.

Fastened to the under surface of the splash plate 324 is a sealing block 326 which is arranged to prevent ink from reaching the ends of the doctor blade 100 and to direct ink from near the ends of the doctor blade generally outwardly toward the press end frame members 10 and 12. To this end, the sealing block has one face 326a substantially parallel to the back edge of the doctor blade 100, this face extending all the way from the inner surface of the frame member to a point inwardly of the innermost position of the doctor blade 100 with respect to the frame member 10. As represented by the dot and dash lines extending parallel to the edge of the doctor blade upper clamping jaw 104 in FIGS. 7 and 8, the doctor blade, as mentioned above, is reciprocated longitudinally with respect to the plate cylinder 14 (not shown in FIGS. 7 and 8). Thus, the end of the doctor blade moves along the face 326a of the sealing block 326, and excess ink accumulating behind the doctor blade is prevented from flowing to the ends of the doctor blade and into the space between the frame member and the edge of the plate cylinder 14. Preferably, the face 326a is disposed closely adjacent the surface of the blade, say spaced at a distance of 0.005 in., but does not contact the blade. Thus, the proper operation of the blade is not affected by contact with another member.

The undersurface 326d of the sealing block 326 conforms generally to the surface of the plate cylinder 14. In the properly adjusted position of the sealing structure 300, as described in detail hereinafter, the undersurface 326d should be disposed closely adjacent to the surface of the plate cylinder 14 without actually contacting and scraping against it, so as to avoid any interference with the wiping action provided by the doctor blade 100. A spacing of about 0.005 in. has been found to be satisfactory, and substantially all of the ink remaining on the plate cylinder as it approaches the doctor blade is removed by the sealing block 326. The small residue of ink not removed by the undersurface of the sealing block 326 is removed by the doctor blade.

The sealing block 326 further includes a second face 326b which intersects the first face 326a at an acute angle and a third face 326c which intersects the second face 326b at an oblique angle, both of these faces being substantially perpendicular to the surface of the cylinder. The faces 326b and 326c are arranged to direct the ing accumulating near the ends of the doctor blade generally outwardly toward the inner surface of the frame member 10. The ink then flows along the inner surface of the frame member 10 and along the underside of the splash plate 324 back onto the base plate 24 of the ink-confining chamber.

The end seal structure 300 is arranged to automatically adjust itself to the doctor blade 100, in all operative position of the doctor blade unit so that any suitable sized cylinder 14 can be mounted in the press without having to manually change the position of the end seal in accordance with the changed position of the doctor blade 100. More particularly, the flange 108 of the doctor blade holder frame member 106 carries a slider member 330 which, as best shown in FIG. 8A, consists of a triangular-shaped body 332 and a laterally extending flange or plate 334. The body 332 is arranged to contact and support the back or upper face of the splash plate 324 adjacent its innermost end. The flange portion 334 of the slider member 330 is engaged by the pin 320 on the bracket 302, the bracket 302 and the pin 320 being urged toward the slider member 330 by the spring 312. The slider member 330 is attached to the downwardly extending flange 108 of the doctor blade holder frame member 106 by screws 336, and the end seal structure 300 is arranged to be positioned so that undersurface 326d of the sealing block 326, will be properly spaced from the surface of the plate cylinder 14, when the doctor blade mechanism is moved into operative position regardless of tolerances or other variables, by providing suitable shims (not shown) behind the slider member 330.

Briefly summarizing the operation of the end seals and their cooperation with other elements of the press, the high-speed rotation of the plate cylinder 14 creates pumping action of the ink as it is scraped off the surface of the cylinder accumulating against the doctor blade 100 which tends to move it to the ends of the doctor blade where it would accumulate in large amounts on the back of the blade. The ink is prevented by the sealing block 326 from passing between the face 326a of the sealing block and the back surface of the doctor blade and between the undersurface 326d and the surface of the plate cylinder 14, and is directed along the faces 326b and 326d of the sealing block 326 toward the inner surface of the adjacent press end frame member 10 or 12. Any splashing of the ink in the area of the end seals is captured by the splash plates 324. Because the splash plates 324 abut the inner surfaces of the frame member, no ink can pass upwardly into the area outside the ink-confining chamber directly above the plate cylinder.

It is one of the features of the present construction that the surfaces of the sealing block which engage the back surface of the doctor blade and the surface of the plate cylinder preserve their sealing engagement automatically for different sizes of plate cylinder normally used on these presses and for the correspondingly different positions of adjustment of the carrier. Specifically the surface 326a on the sealing block 326 maintains a sealing fit with the back side of the doctor blade, and the sealing surface 326d maintains its fit with the surface of the plate cylinder without adjustment over a relatively wide range of cylinder diameter. This is accomplished, as stated, by the mounting of the sealing blocks on respective arms 302 which are arranged closely adjacent the end frame members and which are pivoted for rocking movement coaxially with respect to the lower supporting shaft 132 upon which the carrier member is rockably mounted. The doctor blade has a fixed angling or orientation with respect to the carrier; it follows that in the present construction the sealing block maintains its orientation with respect to the doctor blade in all positions of adjustment of the carrier. Equally important, since the supporting shaft 132 is spaced downwardly at some distance from the doctor blade, the orientation of the doctor blade with respect to the surface of the plate cylinder remains substantially constant over a range of cylinder diameter. The sealing block similarly retains a predetermined orientation with respect to the cylinder surface so that the sealing engagement with the cylinder surface is maintained in spite of the use of cylinders of different diameter. This automatic positioning of the sealing blocks greatly reduces the time required to adjust the press when substituting the plate cylinder with one of different diameter.

Referring to FIGS. 1, 9 and 10, a fixed end cover structure 46 is mounted at each end of the plate cylinder 14 on the frame members 10 and 12. The end covers 46 are at each end of the press and are substantially the same, though reversed, and accordingly only one of them is described herein. Referring particularly to FIGS. 9 and 10, the cover structure 46 includes a T-shaped bracket 350 which is fastened by bolts 352 to the press end frame member 10 and receives a mounting member 354. The member 354 has a groove 355 complementary in shape to the bracket 350 and is slid onto the bracket and fixed in place thereon by a bolt 356. The upper surface of the mounting member 354 is curved to a radius approximately the same as that of the plate cylinder.

A flexible cover element 338 is attached by means of cap screws 339 inserted through a retainer strip 340 to the end of the mounting member adjacent the blade 100, that is, the back end of the cover element. The back edge of the cover element 338 is disposed closely adjacent to the blade 100, and the forward edge is received underneath the transverse plate 42 carried by the front housing member 20 and is held down thereby. When the plate cylinder is removed, the front cover is dropped forward about its hinges, thereby releasing the forward end of the cover element 338 which springs up by its natural resiliency so that the plate cylinder can be moved out through the front of the press.

When it is desired to change from one size plate cylinder to another, the bolt 356 is removed and the mounting member is slid off the bracket 350. For example, as illustrated by the end cover structure 46' at the right end of the press in FIG. 10, larger size end covers 46' are then substituted on the press to accommodate a 48" circumference instead of a 43" circumference cylinder.

To briefly recount the procedure for changing the press to accommodate a plate cylinder of a different size, and specifically by way of example for replacing a small cylinder (e.g., 43" circumference) with a larger one (e.g., 48" circumference), the 43" cylinder is removed in the usual manner with the doctor blade unit in open position, as illustrated in FIGS. 1, 2 or 4, the front cover 20 open, the ink pan 52 in its lowermost position, and the deflector blade 58 retracted outwardly. The end covers 46' are installed in place of the smaller ones 46, and the 48" cylinder is then set in place and locked in.

The ink pan is raised into place, and the deflector blade 58 is set to the desired position by suitably positioning the lever arm 64 and locking it in place. The interceptor 190 is appropriately set for the size of cylinder being used, and the doctor blade unit moved into operative position. The blade, which was previously set in the holder 105 to protrude beyond the final setting and is held loosely by the holder, will then set itself to the cylinder uniformly and to the proper projection as governed by the interceptor setting. The blade is then clamped, and the knob 194 is turned to move the interceptor 190 out of interfering position, and the doctor blade is now ready for operation. The blade setting is done while the cylinder is stopped, and it will be noted that there are no separate bearing support adjustments required.

It will be noted that since the seal blocks 326 are mounted upon arms 302 which are concentric with the lower shaft 132 mounting the carrier, with the lower shaft being substantially spaced from the blade, no readjustment of the sealing means is necessary when substituting a cylinder of different diameter. Nor is it necessary to vary the blade height. This is to be contrasted with conventional presses in common usage in which the carrier, in addition to being rockable toward and away from the plate cylinder, is mounted for bodily adjustment upwardly and downwardly with respect to the press frame in an effort to maintain substantially the same angle of the doctor blade with respect to the surface of plate cylinders of different diameter. Thus set-up time is substantially reduced.

The front cover 20 is then closed, and the press is ready for operation.

It will be understood that the above-described embodiment of the invention is merely exemplary, and that many modifications and variations thereof may be made by those skilled in the art without departing from the spirit and scope of the invention. Thus while the bracket 302 is pivoted about the bolt 304 (FIG. 6), it will be apparent that the guidance for movement of the bracket along the disclosed arcuate path may be achieved by any equivalent means without departing from the invention. All such modifications and variations are intended to be within the scope of the invention as defined in the appended claims.

I claim:
1. A printing press comprising spaced-apart end frame members, a rotatable plate cylinder journaled in the end frame members, means for supplying ink to the surface of the cylinder, adjustable means carrying a doctor blade arranged to longitudinally engage the surface of the plate cylinder and remove ink therefrom, the carrying means being mounted for longitudinal reciprocation to move the blade back and forth across the surface of the cylinder, sealing means at each end of the plate cylinder for preventing the material from passing between the adjacent end of the blade and the adjacent end frame member, the sealing means including a generally L-shaped bracket pivotally mounted on each of the end frame members adjacent the ends of the plate cylinder, a deflector plate carried by each of the brackets and having a first edge abutting the inside surface of the adjacent frame member, a second edge opposite the first edge and disposed inwardly of the adjacent end of the doctor blade, the plate extending generally rearwardly and downwardly with respect to the blade and arranged to deflect material impinging upon its lower surface toward the material supplying means, a sealing element mounted on the undersurface of each of the said plates, the sealing element having a first face substantially parallel to and disposed closely adjacent to the back surface of the end of the doctor blade and cooperating therewith to prevent ink from passing therebetween, a second face intersecting the first face at an acute angle and arranged to direct the ink removed by the blade outwardly toward the adjacent end frame member, an end face abutting the inner surface of the adjacent end frame member and a lower face spaced closely adjacent to the surface of the cylinder and cooperating therewith to prevent material from passing therebetween.

2. The combination according to claim 1 wherein the blade holder includes a surface engaging the upper face of the deflector plate adjacent the inner end thereof.

3. The combination according to claim 1 comprising a downwardly and rearwardly disposed flexible closure strip on said blade holder and a rear housing plate extending between the end frame members, said flexible closure strip being movable with the blade holder and being engageable with the upper edge of said rear housing plate to close off an ink-confining chamber, and the ends of the closure strip overlapping the innermost ends of the deflector plates.

4. The combination according to claim 3 further comprising a deflector strip disposed generally behind the rear housing plate and having an upper edge curving rearwardly with respect to the housing plate, the deflector strip being spaced from the rear housing plate and defining a space therewith through which ink which drips from the lowermost edge of the flexible closure strip when it is disengaged from the upper edge of the rear housing plate is returned to the ink supply means.

5. In apparatus having end frame members, a rotatable cylinder journaled in the frame members, means below the cylinder for supplying fluid material to the surface of the cylinder, adjustable means carrying a doctor blade arranged to longitudinally engage the cylinder and remove material therefrom, and means for reciprocating the blade longitudinally along the surface of the cylinder, the combination therewith of sealing means for preventing the material from passing between the ends of the blade and the frame members comprising a generally L-shaped bracket pivotally mounted on each of the end frame members adjacent the ends of the plate cylinder, a deflector plate carried by each of the brackets and having a first edge abutting the inside surface of the adjacent frame member and a second edge opposite the first edge and disposed inwardly of the adjacent end of the doctor blade, the plate extending generally rearwardly and downwardly with respect to the blade and arranged to deflect material impinging upon its lower surface toward the material supplying means, a sealing element mounted on the undersurface of each of the plates, the sealing element having a first face substantially parallel to and disposed closely adjacent to the back surface of the end of the doctor blade and cooperating therewith to prevent material from passing therebetween, a second face intersecting said first face at an acute angle and arranged to direct material removed by the blade outwardly toward the adjacent end frame member, an end face abutting the inner face of the adjacent end frame member and a lower face spaced closely adjacent to the surface of the cylinder and cooperating therewith to prevent material from passing therebetween.

6. The combination according to claim 5 comprising a pin carried by each of said brackets and extending laterally therefrom in the direction away from the adjacent end frame member and slidably engageable with a surface on the blade carrying means, and means resiliently urging said bracket in a direction to engage said pin against said blade carrying means surface.

7. The combination according to claim 5 comprising guide means on each of the end frame members for slidably retaining the bracket in a predetermined position relative to the adjacent end frame member, whereby said deflector plate and sealing element are engaged against the end frame member.

8. In apparatus having end frame members, a rotatable cylinder journaled in the end frame members, means below the cylinder for supplying fluid material to the surface of the cylinder, means carrying a blade for removing material from the surface of the cylinder, the carrying means being pivotally mounted for movement about an axis parallel to the axis of rotation of the cylinder into predetermined adjusted positions to operatively engage cylinders of different diameters, and means for reciprocating the blade longitudinally across the surface of the cylinder, the combination therewith of sealing means for preventing the material from passing between the ends of the doctor blade and the inner surfaces of the frame members comprising a bracket pivotally attached to each of the end frame members for movement about the axis of pivoting of the blade carrying means, a deflector plate carried by each of the brackets and having a first edge abutting the inside surface of the adjacent frame member and a second edge opposite the first edge and disposed inwardly of the adjacent end of the blade, the plate extending generally rearwardly and downwardly with respect to the blade and arranged to deflect material impinging upon its lower surface toward the material supplying means, a sealing element mounted on the undersurface of each of the plates, the sealing element having a first face substantially parallel to and disposed closely adjacent to the back surface of the end of the doctor blade and cooperating therewith to prevent material from passing therebetween, a second face intersecting the first face at an acute angle and arranged to direct material removed by the blade outwardly toward the adjacent end frame member, an end face abutting the inner face of the adjacent end frame member and a lower face spaced closely adjacent to the surface of the cylinder and cooperating therewith to prevent material from passing therebetween.

9. The combination according to claim 8 comprising a spring for biasing the bracket rearwardly away from the cylinder, and interfering stop members on the bracket and blade-carrying means so that when the blade-carrying means is swung forwardly toward the cylinder the bracket is engaged for movement of the sealing means thereon to operating position at the cylinder.

References Cited

UNITED STATES PATENTS

| | | | |
|---|---|---|---|
| 2,098,750 | 11/1937 | Krahmer | 101—169 |
| 2,528,965 | 11/1950 | Meyer | 101—157 |
| 2,550,454 | 4/1951 | Crafts et al. | 101—157 |
| 2,630,065 | 3/1953 | Caulfield | 101—157 |
| 2,644,395 | 7/1953 | Peyrebrune et al. | 101—157 |
| 2,655,102 | 10/1953 | Ross | 101—157 |
| 2,676,539 | 4/1954 | Behringer | 101—157 |
| 2,692,554 | 10/1954 | Bamford | 101—157 |
| 3,017,828 | 1/1962 | Behringer | 101—157 |
| 3,143,067 | 8/1964 | Haskin | 101—157 |
| 3,198,113 | 8/1965 | Feller | 101—208 |

ROBERT E. PULFREY, *Primary Examiner.*

J. R. FISHER, *Assistant Examiner.*

UNITED STATES PATENT OFFICE
CERTIFICATE OF CORRECTION

Patent No. 3,333,535                               August 1, 1967

Alfred C. Behringer

It is hereby certified that error appears in the above numbered patent requiring correction and that the said Letters Patent should read as corrected below.

In the heading to the printed specification, lines 4 to 6, for "assignor to Publication Corporation, New York, N. Y., a corporation of New York" read -- assignor, by mesne assignments, to Miehle-Goss-Dexter, Incorporated, Chicago, Ill., a corporation of Delaware --.

Signed and sealed this 17th day of December 1968.

(SEAL)
Attest:

Edward M. Fletcher, Jr.                                   EDWARD J. BRENNER

Attesting Officer                                             Commissioner of Patents